Patented Nov. 24, 1942

2,303,193

UNITED STATES PATENT OFFICE 2,303,193

ALLOY

George M. Bouton, Madison, George S. Phipps, Chatham, and Earle E. Schumacher, Maplewood, N. J., assignors to Bell Telephone Laboratories, Incorporated, New York, N. Y., a corporation of New York No Drawing. Application October 4, 1941, Serial No. 413,683

6 Claims. (Cl. 75—166)

This invention relates to lead alloys and more particularly to solder alloys.

While the solder alloys of the present invention may be employed for soldering various kinds of metal, they provide particular advantages in soldering metals which are entirely or predominantly lead. When employed in soldering such metals, the alloys of the present invention adhere tenaciously to the metals being soldered and form joints which are strong and which resist exceptionally well failure due to static stresses.

It has been found that, surprisingly, soldered joints which have good tensile strengths often fail when subjected to a low tensile stress which is applied for a long period, i. e., a static stress. Because of their resistance to failure under such conditions, the solder alloys of the present invention are particularly useful in the joining of split sleeves on lead covered cables, such as are employed for telephone or power lines and, for the purposes of illustration, will be discussed in such connection hereinafter.

Whenever lead covered cables or splices thereof are opened for repair or circuit manipulation, the break in the covering of the cable must ultimately be covered and restored to an absolutely water-tight, and if gas is employed in the cable, gas-tight condition. This is accomplished by superimposing over the break in the covering of the cable a sleeve and sealing the ends in place, as by a wiping solder or the like. Except in those cases in which the conductors in the cable, and hence the cable as a whole, are severed, this sleeve must be split along its entire length to permit it to be placed around the cable and, when the sleeve is in place, the edges of the split sleeve must be joined together by means of a soldered seam to form an impervious tube.

The durability of these seams heretofore has not been as satisfactory as could be desired. It has been found, indeed, that heretofore the occurrence of failures in the seams was greater than in other portions of the cable. When such seam failure occurs, considerable expense and labor are involved in repairing a leaking seam on an aerial cable and usually even greater labor and expense in repairing a seam in an underground cable. Yet such faulty seams must be repaired as soon as possible, for moisture entering a cable through a leaking seam may cause serious damage and interrupt service.

It was found, moreover, that the seams in the sleeves of cables under internal gas pressure tended to fail with even more frequency than did those in sleeves of cables not under gas pressure. In gas-filled cables the gas pressure is relatively small, ranging from about 6 to 9 pounds per square inch and would not appear sufficient to cause failure of the seams due to excessive tensile stress. It appeared, however, that the stress in such cables, although low, when sustained over long periods of time had a tendency to cause the ordinary solders heretofore employed in making such cable sleeve seams to fail at the interfacial layer between the solder metal and the metal of the sleeve; this even though on tensile strength tests rupturing of the metal of the sleeve rather than the seam indicated that the soldered joint had greater tensile strength than the metal of which the sleeve was made.

It is believed that even in cables which are not gas-filled, sufficient sustained stresses are present to cause the seams soldered with ordinary solders to tend to fail and thus impair the durability of such seams.

The solder alloys of the present invention are extremely advantageous for soldering such seams in sleeves on lead covered cables since they greatly minimize or overcome such difficulties. The sleeves on such cables, as well as the cable covering, are predominantly, if not entirely, of lead. The solder alloys of the present invention, when employed in the soldering of such metals, provide strong joints which resist to a much greater degree than the best solders heretofore known the effects of sustained, although low, stresses. Cable sleeves having their seams soldered with the alloys of the present invention show much smaller percentages of failure, even when employed on gas-filled cables, than sleeves having seams soldered with solder alloys heretofore employed, thus greatly reducing the expense and labor of maintaining the cables and thus greatly increasing the continuity of operation of such cables.

The advantageous alloys of the present invention contain by weight about 20 per cent to about 60 per cent of tin, about 0.5 per cent to about 3.0 per cent of cadmium, about 0.2 per cent to about 3.0 per cent of antimony, about 0.1 per cent to about 1.5 per cent of copper, and the balance substantially entirely of lead. Advantageous results are provided when the tin and lead are present in approximately equal amounts. The alloy may also contain small amounts of other metals, such as the usual impurities in commercial lead, which are present in amounts insufficiently deleteriously to affect the alloys.

Tin in the indicated amount provides a low melting range for the solder, since amounts of tin in the indicated ranges will provide in the solder a large amount of low melting tin-lead eutectic, particularly when the tin and lead are present in approximately equal amounts.

Individual additions of antimony or cadmium appear to be ineffective in improving the resistance to failure due to static stressing. However, the employment of both of these alloying metals in the amounts indicated appears to double the durability of seams under static stress. About 1 per cent of cadmium is the most desirable percentage within the range indicated. Amounts of cadmium greater than that indicated as the upper limit of the indicated range do not appear appreciably to add to resistance to failure under such stress, while amounts less than that indicated in the range appear to be insufficient to have any beneficial effect.

Antimony in an amount less than the indicated range of antimony does not appear to be beneficial, while if employed in amounts more than those indicated in the above range does not appear appreciably to improve the resistance to failure of the seam under static stressing beyond the improvement provided by the indicated amounts of antimony. About 0.5 per cent of antimony appears to provide the most beneficial results.

Commercial lead usually contains copper as an impurity. However in such case the copper is present in amounts considerably less than those indicated above. The presence of copper in the above indicated amounts provides greatly increased resistance to failure due to prolonged stressing. Copper in excess of the amount indicated does not appreciably improve such durability over that provided by copper in the amounts indicated; copper in less than the amount indicated is not sufficient materially to improve the durability over ordinary lead-tin alloys.

A particularly advantageous alloy embodying the invention consists of about 1 per cent cadmium, 0.5 per cent antimony, 0.25 per cent copper, and a balance consisting of substantially equal parts of lead and tin. This alloy solders easily and when employed in soldered seams in lead cable sleeves has been found to provide great resistance to failure, particularly failure due to static stressing.

The alloys of the present invention may be made according to procedures well-known in the art, so that no discussion of their preparation is necessary.

Although the invention has been discussed in connection with one particular use, it is apparent that alloys of the present invention may be employed for other purposes. It is intended that the patent shall cover by suitable expression in the appended claims whatever features of patentable novelty reside in the invention.

What is claimed is:

1. An alloy containing by weight substantially 20 per cent to 60 per cent of tin, 0.5 per cent to 3.0 per cent of cadmium, 0.2 per cent to 3.0 per cent of antimony, 0.1 per cent to 1.5 per cent of copper, and a balance consisting substantially entirely of lead.

2. A solder containing by weight substantially 20 per cent to 60 per cent of tin, 0.5 per cent to 3.0 per cent of cadmium, 0.2 per cent to 3.0 per cent of antimony, 0.1 per cent to 1.5 per cent of copper, and a balance consisting substantially entirely of lead.

3. An alloy containing by weight substantially 0.5 per cent to 3.0 per cent of cadmium, 0.2 per cent to 3.0 per cent of antimony, 0.1 per cent to 1.5 per cent of copper, and a balance consisting substantially entirely of approximately equal parts of lead and tin.

4. An alloy containing by weight about 1.0 per cent of cadmium, 0.5 per cent of antimony, 0.25 per cent of copper, and a balance consisting substantially entirely of approximately equal parts of lead and tin.

5. A solder consisting by weight of about 1.0 per cent cadmium, 0.5 per cent antimony, 0.25 per cent copper, and a balance consisting substantially entirely of approximately equal parts of lead and tin.

6. A soldered joint in which the solder contains by weight substantially 20 per cent to 60 per cent of tin, 0.5 per cent to 3.0 per cent of cadmium, 0.2 per cent to 3.0 per cent of antimony, 0.1 per cent to 1.5 per cent of copper, and a balance consisting substantially entirely of lead.

GEORGE M. BOUTON.
GEORGE S. PHIPPS.
EARLE E. SCHUMACHER.